(12) United States Patent
Ishii et al.

(10) Patent No.: US 7,680,072 B2
(45) Date of Patent: Mar. 16, 2010

(54) RADIO COMMUNICATIONS CONTROL SYSTEM, RADIO COMMUNICATIONS CONTROL METHOD

(75) Inventors: Hiroyuki Ishii, Yokosuka (JP); Masafumi Usuda, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1585 days.

(21) Appl. No.: 10/820,814

(22) Filed: Apr. 9, 2004

(65) Prior Publication Data
US 2004/0202104 A1 Oct. 14, 2004

(30) Foreign Application Priority Data
Apr. 9, 2003 (JP) ............................. 2003-105368

(51) Int. Cl.
*H04B 7/185* (2006.01)
(52) U.S. Cl. .................................... 370/318
(58) Field of Classification Search ................ 455/522
See application file for complete search history.

(56) References Cited

U.S. PATENT DOCUMENTS

| 6,873,626 | B2 * | 3/2005 | Hayashi et al. ............. 370/465 |
| 6,934,556 | B2 * | 8/2005 | Takano ....................... 455/522 |
| 7,406,070 | B2 * | 7/2008 | Nilsson ...................... 370/342 |
| 2002/0077141 | A1 * | 6/2002 | Hwang et al. ............... 455/522 |
| 2002/0136193 | A1 * | 9/2002 | Chang et al. ................ 370/347 |
| 2003/0039217 | A1 * | 2/2003 | Seo et al. .................... 370/318 |
| 2003/0112773 | A1 * | 6/2003 | Lee et al. .................... 370/318 |
| 2003/0114181 | A1 * | 6/2003 | Lee et al. .................... 455/522 |
| 2003/0128673 | A1 * | 7/2003 | Lee et al. .................... 370/318 |
| 2003/0134655 | A1 * | 7/2003 | Chen et al. .................. 455/522 |
| 2003/0189918 | A1 * | 10/2003 | Das et al. .................... 370/349 |
| 2003/0228865 | A1 * | 12/2003 | Terry ....................... 455/422.1 |
| 2004/0242255 | A1 * | 12/2004 | Hayashi et al. ............. 455/522 |

FOREIGN PATENT DOCUMENTS

| EP | 1089458 A2 | 4/2001 |
| EP | 1207629 A2 | 5/2002 |
| WO | WO 98/58461 | 12/1998 |

OTHER PUBLICATIONS

Das et al., Design and Performance of Down link shared control channel for HSDPA, Sep. 15-18, 2002, IEEE, vol. 3, pp. 1088-1091.*
U.S. Appl. No. 11/330,346, filed Jan. 12, 2006, Ishii, et al.

(Continued)

*Primary Examiner*—Anh-Vu H Ly
(74) *Attorney, Agent, or Firm*—Oblon, Spivak, McClelland, Maier & Neustadt, L.L.P.

(57) ABSTRACT

A radio communications system of this invention is configured to control transmission power of a shared control channel for transmitting control signals to a plurality of mobile stations. The radio communications system has a transmission power controller configured to control the transmission power of the shared control channel, in accordance with transmission power of a dedicated channel accompanying the shared control channel, and communication quality of the shared control channel.

9 Claims, 7 Drawing Sheets

OTHER PUBLICATIONS

"3rd Generation Partnership Project; Technical Specification Group Radio Access Network; Physical channels and mapping of transport channels onto physical channels (FDD) (Release 5)", 3GPP TS 25.211, vol. 5.0.0, 2002-2003.

U.S. Appl. No. 11/911,596, filed Oct. 15, 2007, Ishii, et al.

U.S. Appl. No. 11/911,607, filed Oct. 15, 2007, Ishii, et al.

Salonaho, O. et al.: "Flexible Power Allocation for Physical Control Channel in Wideband CDMA"; 1999 IEEE 49th Houston, TX, USA; May 16-20, 1999, Piscataway, NJ, USA; IEEE, US, vol. 2, May 16, 1999, pp. 1455-1458, XP 010342093.

* cited by examiner

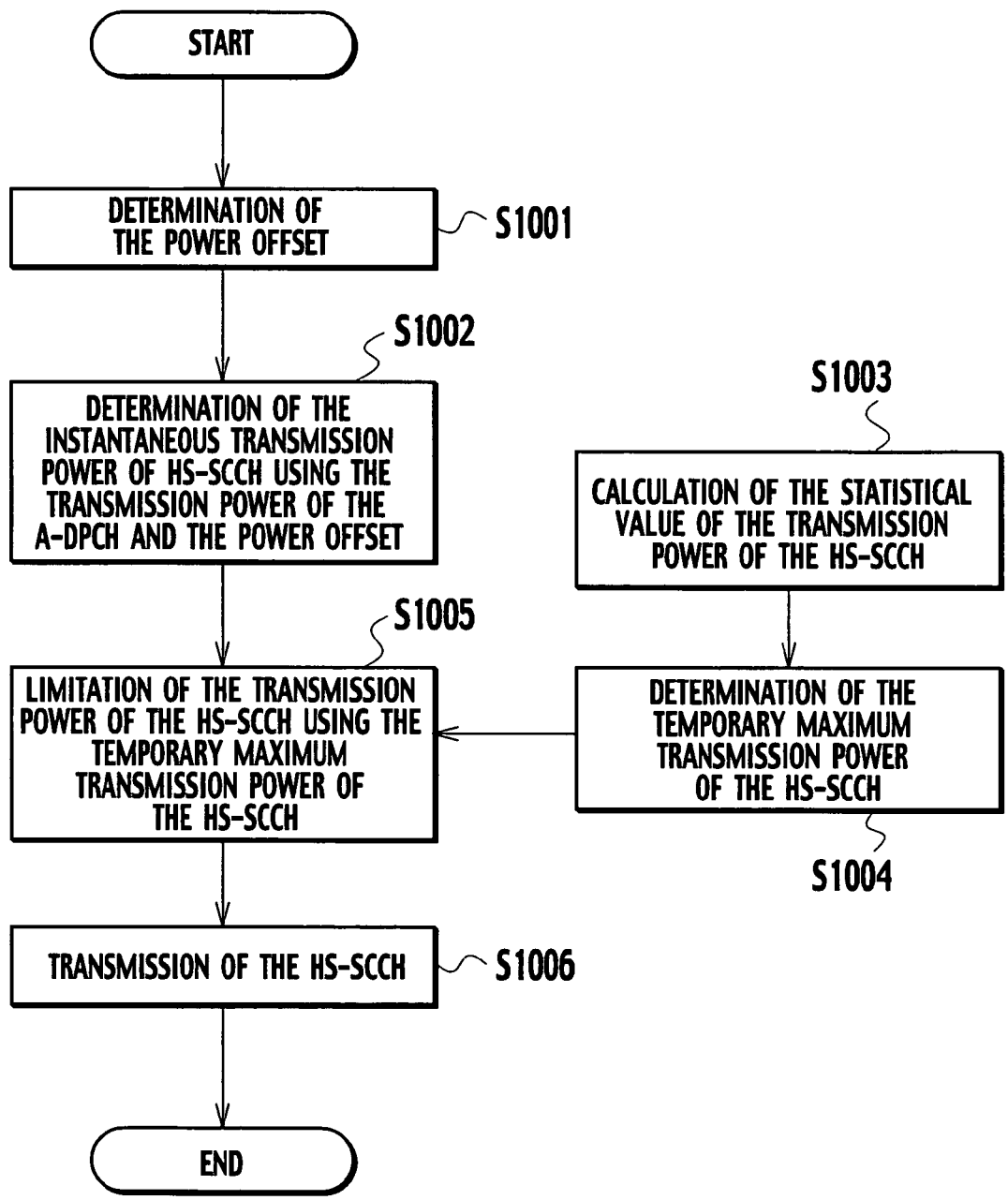

RADIO COMMUNICATIONS CONTROL SYSTEM, RADIO COMMUNICATIONS CONTROL METHOD

CROSS REFERENCE TO RELATED APPLICATION

This application is based upon and claims the benefit of priority from the prior Japanese Patent Application No. P2003-105368, filed on Apr. 9, 2003; the entire contents of which are incorporated herein by reference.

BACKGROUND OF THE INVENTION

1. Field of the Invention

The present invention relates to a radio communications system and a radio communications method for controlling transmission power of a shared control channel for transmitting control signals to a plurality of mobile stations.

2. Description of the Related Art

Recently, in the IMT-2000 (International Mobile Telecommunications-2000), studies have been conducted on a HSDPA (High Speed Downlink Packet Access) system as the radio communications control system described above which is a higher speed downlink packet transmission system having the purposes of achieving a higher peak transmission speed, a lower transmission delay and a higher throughput etc.

The HSDPA system is a transmission system for carrying out communications by sharing one physical channel among a plurality of mobile stations in a time-division manner. The HSDPA system assigns a channel to a mobile station of better radio quality at each moment. Thus, it is possible to improve throughput of the entire system.

In order to carry out communications by sharing one physical channel among a plurality of mobile stations in a time-division manner as described above, the mobile station which carries out communications by using the physical channel concerned must be notified at each TTI (Transmission Time Interval). In the case of the HSDPA system, the notification is made to the plurality of mobile stations by using a shared control channel called HS-SCCH (High Speed-Shared Control Channel).

In the conventional HSDPA system, a base station has set transmission power to be allocated to the HS-SCCH by adding a power offset to transmission power of a dedicated channel (A-DPCH: Associated-Dedicated Physical Channel) accompanying the HS-channels (HS-SCCH and HS-PDSCH).

Additionally, in the conventional HSDPA system, the base station has sometimes set an upper limit value (maximum transmission power) of the transmission power of the HS-SCCH, to prevent excessive allocation of transmission power to the HS-SCCH.

However, in the conventional HSDPA system, because of a difference in interleaving effects due to a large difference between the TTI length of the HS-SCCH and the TTI length of the A-DPCH accompanying the HS-channels (HS-SCCH and HS-PDSCH), there has been a problem in that it is difficult to carry out appropriate transmission power control using the same power offset between cases of small and large moving speeds of the mobile station.

Furthermore, in the conventional HSDPA system, in the case of setting an upper limit value of transmission power of the HS-SCCH so as to prevent excessive allocation of transmission power to the HS-SCCH, there has been a problem in that it is difficult to carry out efficient allocation of the transmission power to HS-SCCH and HS-PDSCH (High Speed-Physical Downlink Shared Channel) for each TTI, because of a deviation in transmission timing of the HS-SCCH from transmission timing of the HS-PDSCH.

Incidentally, the HS-PDSCH is a physical channel used for transmitting the HS-DSCH (High Speed-Downlink Shared Channel).

The aforementioned problems will be described in detail with reference to FIG. 1 and FIG. 2.

FIG. 1 shows an example of a method for allocating transmission power in the case of assuming transmission timing of the HS-SCCH is equal to transmission timing of the HS-PDSCH in the conventional HSDPA system.

FIG. 2 shows an example of a method for allocating transmission power when transmission timing of the HS-SCCH deviates from transmission timing of the HS-PDSCH in the conventional HSDPA system.

Here, transmission power obtained by subtracting transmission power allocated to a non HS-Channel from maximum total transmission power of the base station can be allocated as the transmission power of the HS-SCCH and the transmission power of the HS-PDSCH.

Additionally, in the conventional HSDPA system, the transmission power of the HS-SCCH is determined within a range not exceeding the aforementioned obtained transmission power, and transmission power obtained by subtracting the transmission power of the HS-SCCH from the aforementioned obtained transmission power is allocated as the transmission power of the HS-PDSCH.

In the conventional HSDPA system, the transmission power of the HS-SCCH is controlled by a predetermined algorithm. An upper limit value (maximum transmission power) of the transmission power of the HS-SCCH may be set in order to prevent excessive allocation of transmission power to the HS-SCCH.

In the example of FIG. 1, the transmission timing of the HS-SCCH is assumed to coincide with the transmission timing of the HS-PDSCH. Thus, the transmission power of the HS-PDSCH is set to a large value if the transmission power of the HS-SCCH is small, and the transmission power of the HS-PDSCH is set to a small value if the transmission power of the HS-SCCH is large. As a result, the base station can execute efficient transmission power allocation.

However, according to specifications of the HSDPA system defined in 3GPP, due to the fact that the transmission timing of the HS-SCCH deviates from the transmission timing of the HS-PDSCH by 2 slots as shown in the example of FIG. 2, it is difficult to carry out the aforementioned efficient transmission power allocation.

That is, in the example of FIG. 2, the transmission power of the HS-SCCH and the transmission power of the HS-PDSCH at predetermined TTI are respectively affected by the transmission power of the HS-PDSCH and the transmission power of the HS-SCCH at next TTI. Consequently, efficient allocation of the transmission power becomes difficult.

Specifically, as shown in FIG. 2, the transmission power of HS-SCCH#1 is affected by the transmission power of HS-PDSCH#1, the transmission power of the HS-PDSCH#1 is affected by the transmission power of HS-SCCH#2, and the transmission power of the HS-SCCH#2 is affected by the transmission power of HS-PDSCH#2. Accordingly, in such a case, the transmission power must be determined by considering all future transmission power in order to carry out transmission power allocation similar to that shown in FIG. 1. Realization thereof becomes difficult.

In order to solve the problem, as shown in FIG. 3, a method has been presented to secure the transmission power of the HS-SCCH in a fixed manner by defining an upper limit value (maximum transmission power) of the HS-SCCH, if the transmission timing of the HS-SCCH deviates from the transmission timing of the HS-PDSCH in the conventional HSDPA system.

However, in such a case, compared with the transmission power allocation method as shown in FIG. 1, there is a problem of reduced efficiency in use of transmission power. That is, in the described case, certain transmission power must be secured for the HS-SCCH. Consequently, the transmission power allocated to the HS-PDSCH is reduced, and then throughput of the system and each user will be decreased.

BRIEF SUMMARY OF THE INVENTION

The present invention has been made in view of the above problems, and has an object of providing a radio communications control system, a radio communications control method which efficiently control transmission power of a shared control channel (HS-SCCH) for transmitting control signals to a plurality of mobile stations, even if transmission timing of the shared control channel deviates from transmission timing of a shared packet channel (HS-PDSCH) for transmitting packet data to the plurality of mobile stations.

A first aspect of the present invention is summarized as a radio communications control system for controlling transmission power of a shared control channel for transmitting control signals to a plurality of mobile stations.

The radio communications control system has a transmission power controller configured to control the transmission power of the shared control channel, in accordance with transmission power of a dedicated channel accompanying the shared control channel, and communication quality of the shared control channel.

In the first aspect, the transmission power controller can be arranged to set the transmission power of the shared control channel, by changing the transmission power of the dedicated channel based on a power offset. And the transmission power controller can be arranged to control the power offset in accordance with the communication quality of the shared control channel.

In the first aspect, the transmission power controller can be arranged to use a block error rate of the shared control channel, as the communication quality of the shared control channel. And the transmission power controller can be arranged to control the power offset so that the block error rate of the shared control channel can be a target value.

In the first aspect, a shared packet channel for transmitting packet data to the plurality of mobile stations can be transmitted after the shared control channel. And the transmission power controller can be arranged to use feedback information used for retransmission control in the shared packet channel, as the communication quality of the shared control channel. Furthermore, the transmission power controller can be arranged to decrease the power offset when receiving the feedback information, and to increase the power offset when not receiving the feedback information.

In the first aspect, a shared packet channel for transmitting packet data to the plurality of mobile stations can be transmitted after the shared control channel. And the transmission power controller can be arranged to control the power offset in accordance with a service type of the shared packet channel.

In the first aspect, the radio communications system can have a maximum transmission power controller configured to control a maximum transmission power of the shared control channel during a predetermined period. And the transmission power controller can be arranged to control the transmission power of the shared control channel so as not to exceed the maximum transmission power.

In the first aspect, the maximum transmission power controller can be arranged to control the maximum transmission power in accordance with a statistical value of the transmission power of the shared control channels.

In the first aspect, the maximum transmission power controller can be arranged to control the maximum transmission power so as not to exceed an upper limit value per each of the shared control channels.

A second aspect of the present invention is summarized as a radio communications control method for controlling transmission power of a shared control channel for transmitting control signals to a plurality of mobile stations.

The radio communications control method includes a step of controlling the transmission power of the shared control channel, in accordance with transmission power of a dedicated channel accompanying the shared control channel, and communication quality of the shared control channel.

BRIEF DESCRIPTION OF THE SEVERAL VIEWS OF THE DRAWINGS

FIG. 7 is a flowchart showing a radio communications control method according to the embodiment of the present invention.

DETAILED DESCRIPTION OF THE INVENTION

First Embodiment of the Invention

Description will be made on a configuration of a radio communications control system according to a first embodiment of the present invention with reference to FIGS. 4 to 6.

Figure 1:
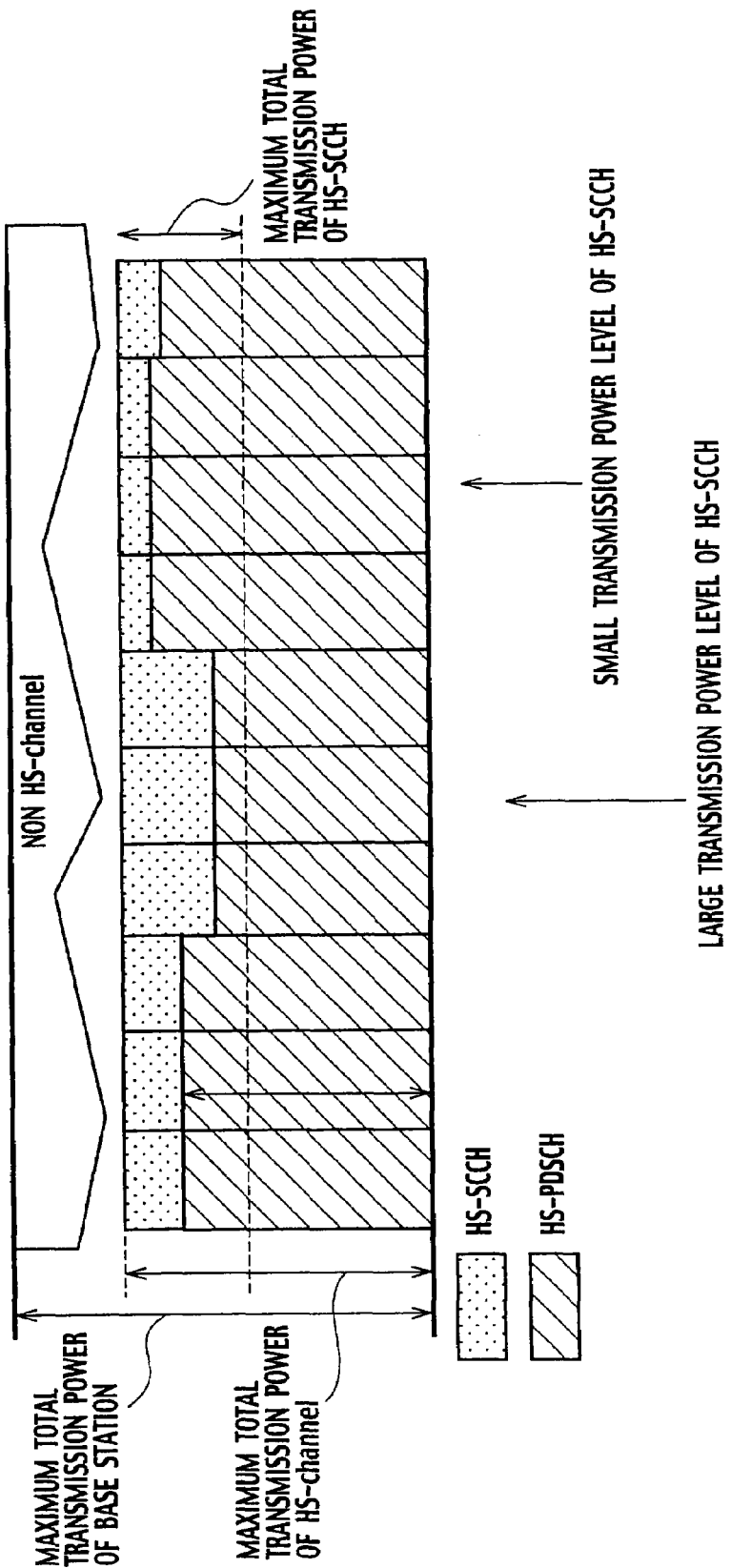
FIG. 1 is a view showing an example of a method for controlling transmission power of a shared control channel in a radio communications control system.
Figure 2:
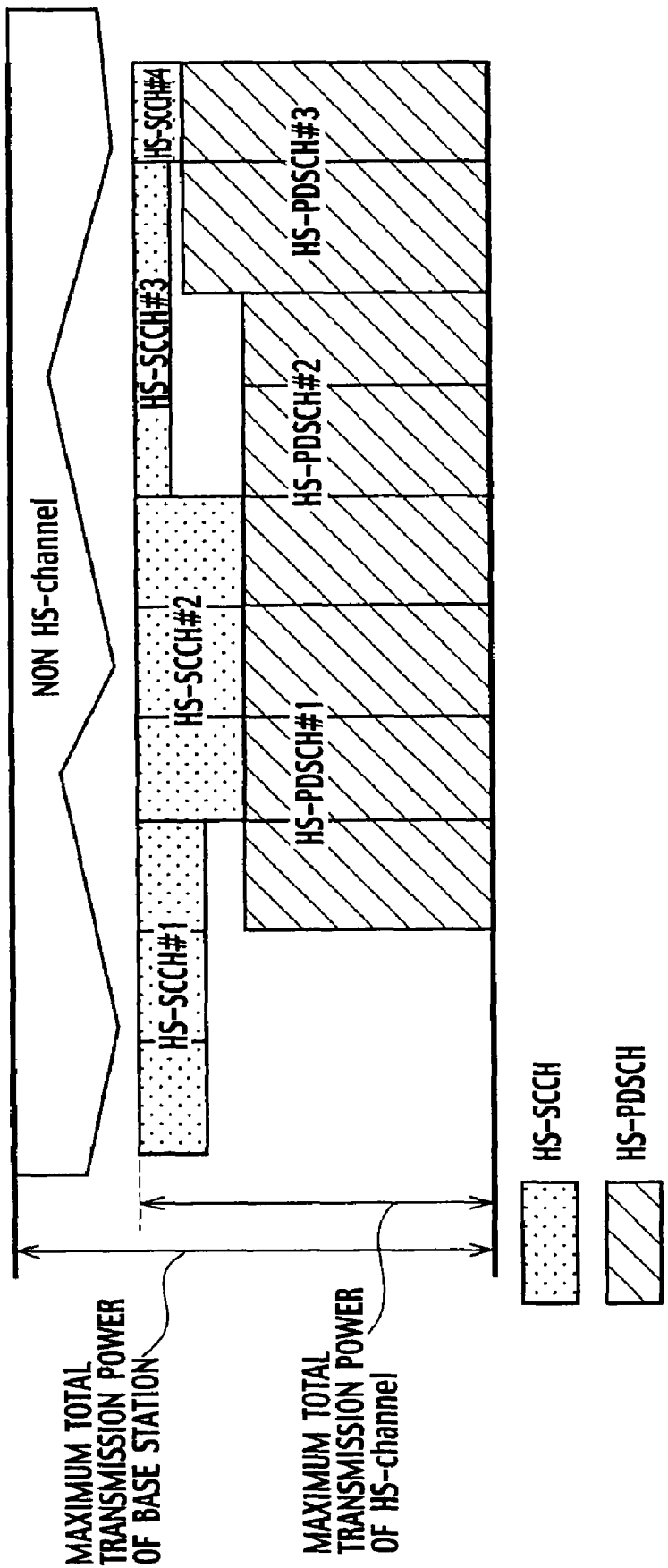
FIG. 2 is a view showing an example of a method for controlling the transmission power of the shared control channel in the radio communications control system of the conventional art.
Figure 3:
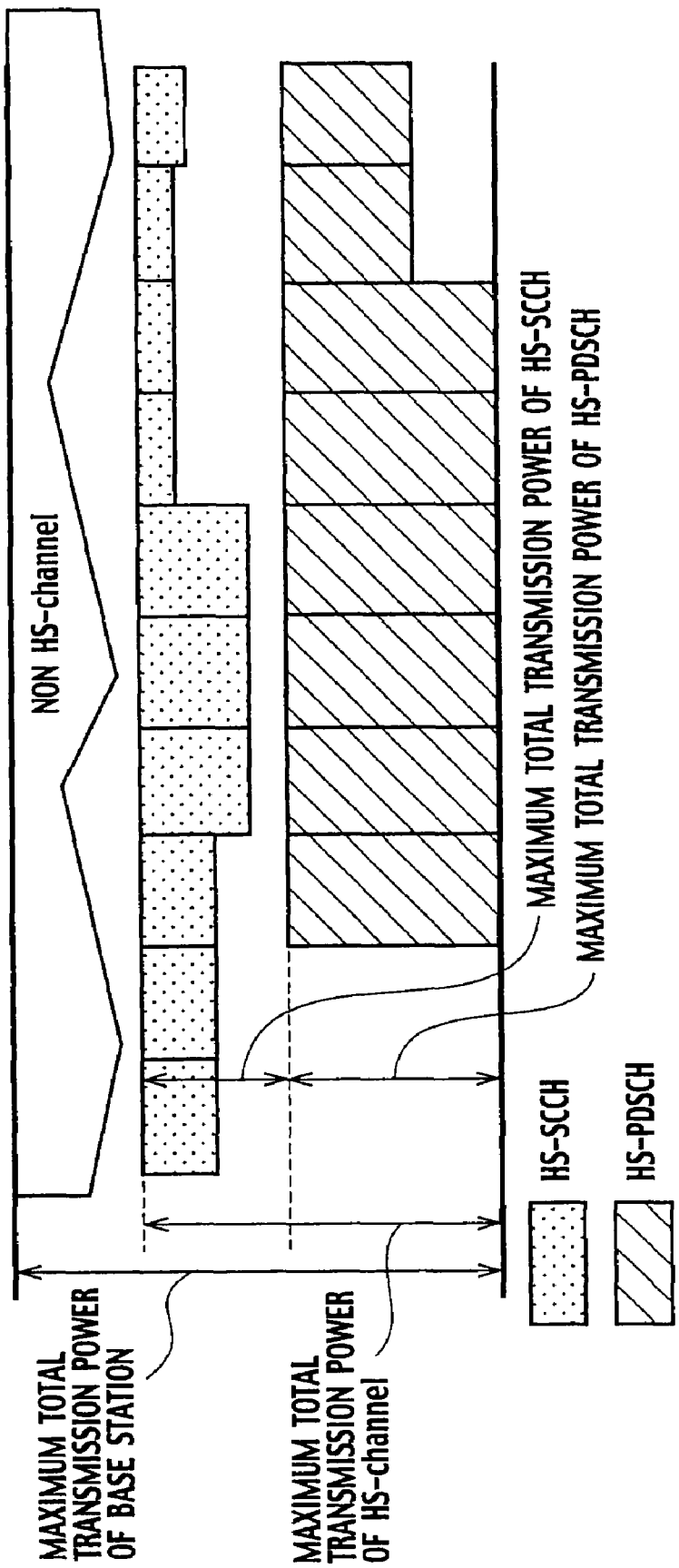
FIG. 3 is a view showing an example of a method for controlling the transmission power of the shared control channel in the radio communications control system of the conventional art.
Figure 4:
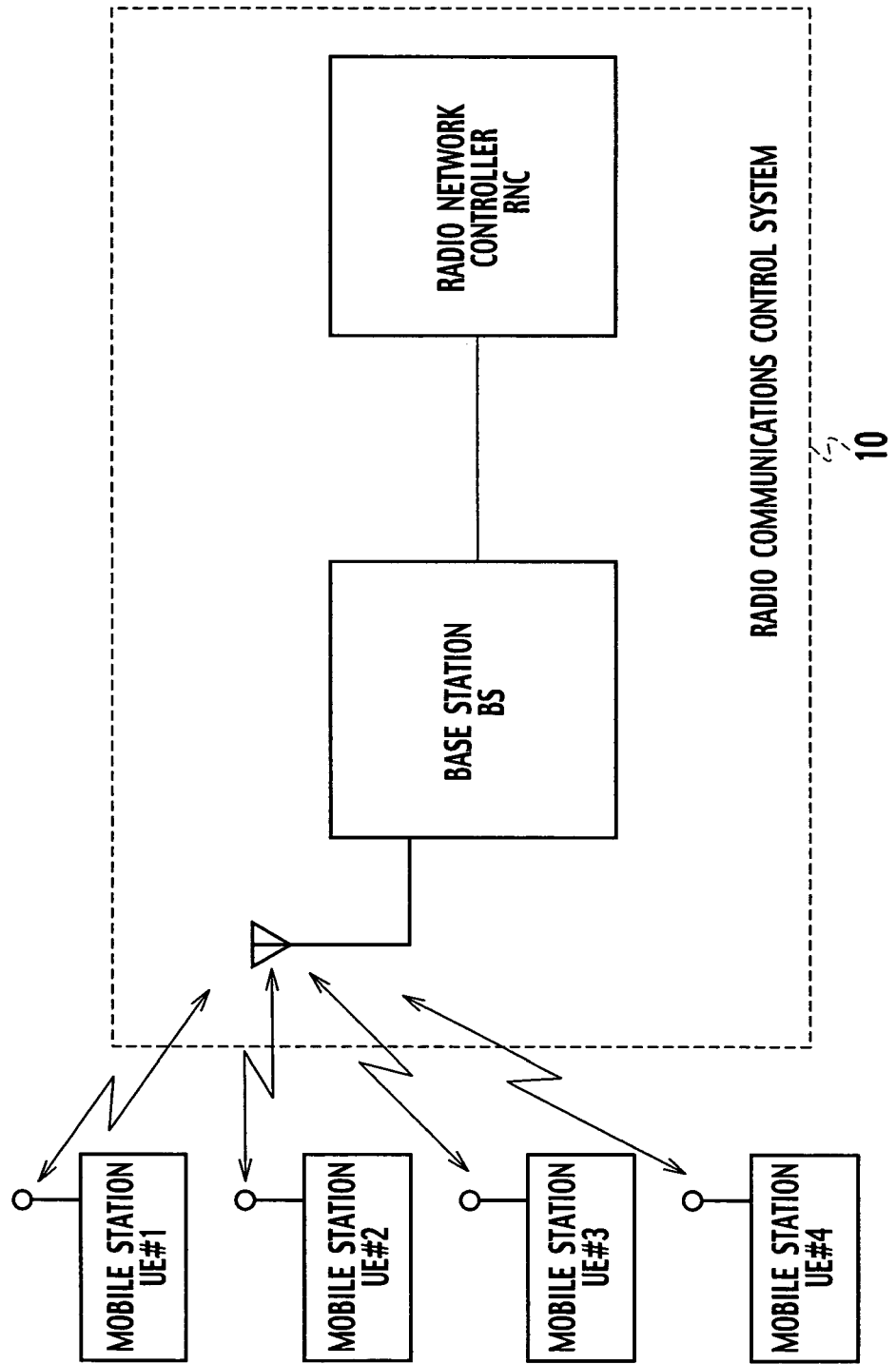
FIG. 4 is an overall configuration view of a radio communications control system according to an embodiment of the present invention.

FIG. 4 is an overall configuration view of the radio communications control system of the embodiment. As shown in FIG. 4, the radio communications control system of the embodiment is configured with a base station BS connected to a plurality of mobile stations UE#1 to #4 via radio circuits, and a radio network controller RNC for managing the base station BS.

Incidentally, the embodiment will be described on the case in which the radio communications control system is configured with the base station BS and the radio network controller RNC. However, the present invention is not limited to such cases. The present invention can be applied to a case in which the radio communications control system is configured with only the base station BS, or a case in which the radio communications control system is configured with only the radio network controller RNC.

Though only four mobile stations UE#1 to #4 are shown in FIG. 4, the radio communications control system of the embodiment can have a plurality of mobile stations other than 4.

Moreover, the radio communications control system of the embodiment controls transmission power of a shared control channel (hereinafter referred to as HS-SCCH) for transmitting control signals to the plurality of mobile stations UE#1 to #4, when the HSDPA system is applied in the IMT-2000 system which uses a W-CDMA mode.

Here, the mobile stations UE#1 to #4 are configured to carry out radio communications with the base station BS by using the HSDPA system. Each mobile station reports a transmission power control command (TPC command) for controlling transmission power of a dedicated channel (hereinafter referred to as A-DPCH) accompanying the HS-channels (HS-SCCH and HS-PDSCH), to the base station by using an uplink radio circuit.

Figure 5:
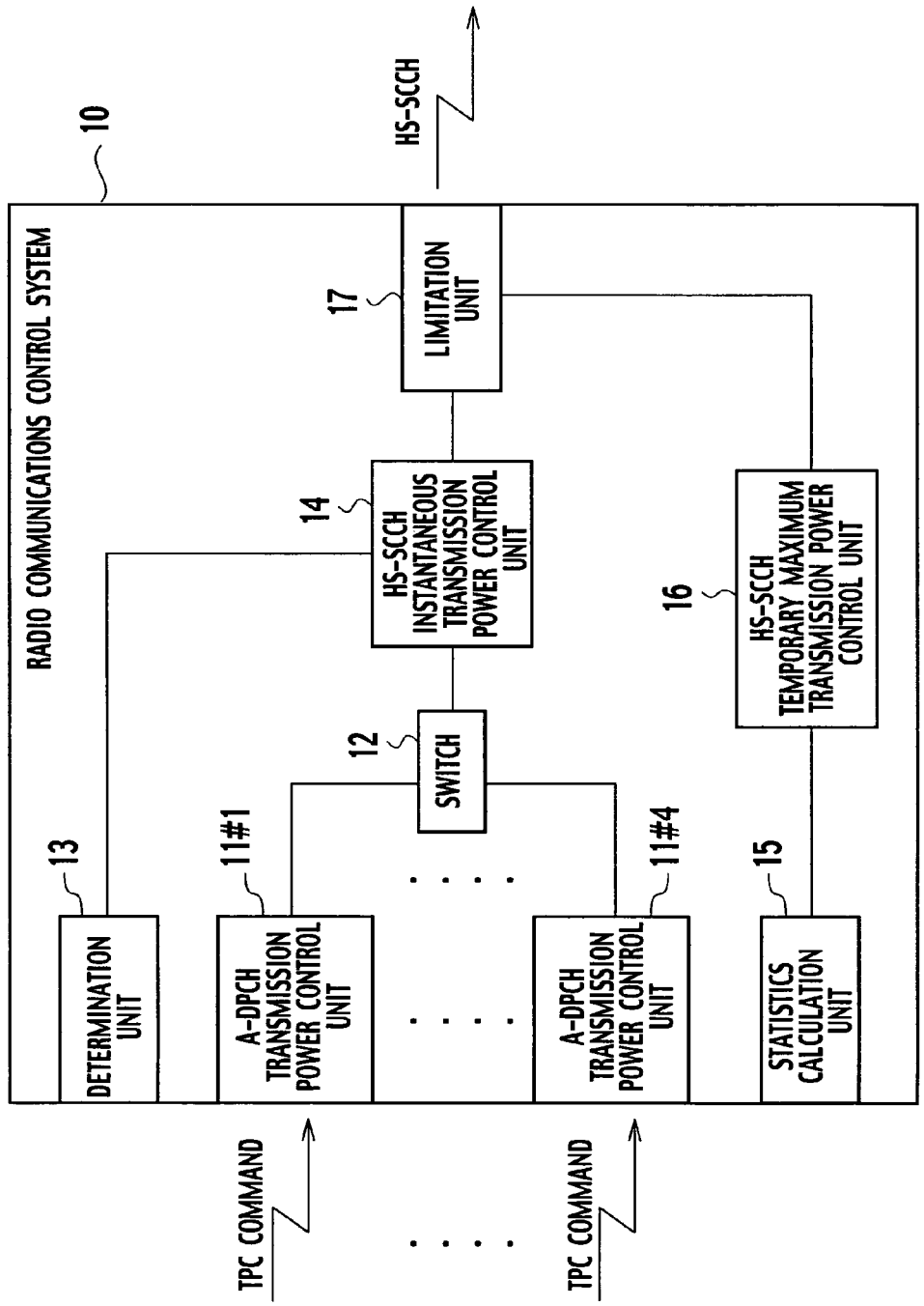
FIG. 5 is a functional block diagram of the radio communications control system according to the embodiment of the present invention.

As shown in FIG. 5, the radio communications control system of the embodiment includes a plurality of A-DPCH transmission power control units (A-DPCH power controllers) 11#1 to 11#4, a switch 12, a determination unit 13, an HS-SCCH instantaneous transmission power control unit (HS-SCCH Inst Power Controller) 14, a statistics calculation unit (Statistics Calculator) 15, an HS-SCCH temporary maximum transmission power control unit (HS-SCCH Temporary Max Power Controller) 16, and a limitation unit (Power Limiter) 17.

The A-DPCH transmission power control units 11#1 to 11#4 are disposed for the mobile stations UE#1 to #4 respectively. Each of A-DPCH transmission power control unit 11#1 to 11#4 is configured to carry out transmission power control of the A-DPCH of each of the mobile stations UE#1 to #4, by using the transmission power control command transmitted from each of the mobile stations UE#1 to #4.

The switch 12 is configured to transmit information showing the transmission power of the A-DPCH of the mobile station to which the HS-SCCH is allocated, together with identification information of the mobile station, to the HS-SCCH instantaneous transmission power control unit 14.

The determination unit 13 is configured to determine communication quality (communication state) of the HS-SCCH, and to transmit a result of the determination to the HS-SCCH instantaneous transmission power control unit 14.

For example, the determination unit 13 may be configured to determine whether or not a block error rate of the HS-SCCH exceeds a predetermined value, as the communication quality (the communication state) of the HS-SCCH.

Additionally, the determination unit 13 may be configured to determine whether or not feedback information used for retransmission control (HARQ) of an HS-DSCH in a shared packet channel (hereinafter referred to as HS-PDSCH) is "Ack", "Nack" or "DTX", as the communication quality (the communication state) of the HS-SCCH, by using an HS-DPCCH (High Speed-Dedicated Physical Control Channel).

The HS-SCCH instantaneous transmission power control unit 14 is configured to control the transmission power of the HS-SCCH (HS-SCCH instantaneous transmission power) at predetermined TTI, based on the transmission power of the A-DPCH accompanying the HS-channels (HS-SCCH and HS-PDSCH) and the communication quality of the HS-SCCH.

Specifically, the HS-SCCH instantaneous transmission power control unit 14 receives identification information of the mobile station to which the HS-SCCH is assigned at the TTI and the transmission power of the A-DPCH at the TTI, from the switch 12.

The HS-SCCH instantaneous transmission power control unit 14 receives the determination result from the determination unit 13.

The HS-SCCH instantaneous transmission power control unit 14 determines the transmission power of the HS-SCCH (HS-SCCH instantaneous transmission power) which satisfies a desired block error rate of the HS-SCCH, based on a predetermined instantaneous transmission power control algorithm, by using the received identification information, the received transmission power of the A-DPCH, and the received determination result.

The HS-SCCH instantaneous transmission power control unit 14 transmits the determined transmission power of the HS-SCCH (HS-SCCH instantaneous transmission power) to the limitation unit 17.

Now, description will be made of an example of a first instantaneous transmission power control algorithm in which the HS-SCCH instantaneous transmission power control unit 14 controls the transmission power of the HS-SCCH (HS-SCCH instantaneous transmission power) by using a determination result of the feedback information used for the HARQ corresponding to the HS-DSCH in the HS-PDSCH transmitted to the mobile station UE#i as the communication quality of the HS-SCCH.

Incidentally, it is assumed that the HS-SCCH instantaneous transmission power control unit 14 sets the transmission power of the HS-SCCH (HS-SCCH instantaneous transmission power), by changing the transmission power of the A-DPCH based on a power offset, and controls the power offset in accordance with the communication quality of the HS-SCCH.

Specifically, the HS-SCCH instantaneous transmission power control unit 14 calculates the transmission power of the HS-SCCH (HS-SCCH instantaneous transmission power) $P_{HS\text{-}SCCH}$, based on the following equation using the power offset $\Delta i$ of the mobile station UE#i and the transmission power $P_{A\text{-}DPCHi}$ of the A-DPCH of the mobile station UE#i, if the HS-SCCH is assigned to the mobile station UE#i at certain TTI.

$$P_{HS\text{-}SCCH} = P_{A\text{-}DPCHi} + \Delta i$$

Additionally, the HS-SCCH instantaneous transmission power control unit 14 adjusts the power offset $\Delta i$ of the mobile station UE#i, based on the following equations using the determination result of the feedback information of the HARQ corresponding to the HS-DSCH in the HS-PDSCH transmitted to the mobile station UE#i. The determination result is transmitted from the determination unit 13.

$\Delta i = \Delta i - \Delta \text{adj} \times \text{BLER}_{target}$ (in the case that a determination result is "Ack")

$\Delta i = \Delta i - \Delta \text{adj} \times \text{BLER}_{target}$ (in the case that a determination result is "Nack")

$\Delta i = \Delta i + \Delta \text{adj} \times (1 - \text{BLER}_{target})$ (in the case that a determination result is "DTX")

Here, $\text{BLER}_{target}$ is a target value of the block error rate of the HS-SCCH, $\Delta \text{adj}$ is a value used for adjusting the power offset.

"Ack" indicates that communications of the HS-DSCH are "OK", "Nack" indicates that communications of the HS-DSCH are "NG", and "DTX" indicates that no feedback information is received.

As shown in the above equations, when the determination result is "Ack" or "Nack", i.e., when the feedback information used for the retransmission control (HARQ) is received, the HS-SCCH instantaneous transmission power control unit 14 controls to decrease the power offset, since communications of the HS-SCCH for signaling of the HS-DSCH are "OK".

On the other hand, when the determination result is "DTX", i.e., when no feedback information used for retransmission control (HARQ) is received, the HS-SCCH instantaneous transmission power control unit 14 controls to increase the power offset, since communications of the HS-SCCH for signaling of the HS-DSCH are "NG".

Additionally, description will be made of an example of a second instantaneous transmission power control algorithm in which the HS-SCCH instantaneous transmission power control unit 14 controls transmission power of the HS-SCCH (HS-SCCH instantaneous transmission power), by using a block error rate of the HS-SCCH as the communication quality of the HS-SCCH.

The second instantaneous transmission power control algorithm is different from the first instantaneous power control algorithm in a method of adjusting the power offset Δi by the HS-SCCH instantaneous transmission power control unit 14.

Here, the HS-SCCH instantaneous transmission power control section 14 adjusts the power offset Δi, based on the following equation, so that a block error rate of the HS-SCCH can be a target value $BLER_{target}$.

$\Delta i = \Delta i - \Delta adj$ (in the case that a determination result shows that a block error rate in the HS-SCCH is lower than a predetermined value)

$\Delta i = \Delta i + \Delta adj$ (in the case that a determination result shows that a block error rate in the HS-SCCH is higher than a predetermined value)

As indicated by the above equations, the HS-SCCH instantaneous transmission power control unit 14 controls to decrease the power offset, when the determination result shows that the block error rate of the HS-SCCH is lower than the predetermined value.

On the other hand, the HS-SCCH instantaneous transmission power control unit 14 controls to increase the power offset, when the determination result shows that the block error rate of the HS-SCCH is higher than the predetermined value.

Additionally, the second instantaneous transmission power control algorithm may adjust the power offset Δi, based on the following equation, instead of the adjustment of the power offset Δi based on the above equations.

$\Delta i = \Delta i - \Delta adj \times BLER_{target}$ (in case that a determination result is that there is no block error in the HS-SCCH)

$\Delta i = \Delta i + \Delta adj \times (1 - BLER_{target})$ (in case that a determination result is that there is a block error in the HS-SCCH)

Furthermore, the HS-SCCH instantaneous transmission power control unit 14 may control the power offset in accordance with a service type of the HS-DSCH subjected to signaling at the HS-SCCH.

Here, the HS-SCCH instantaneous transmission power control unit 14 controls the power offset Δi based on the following equations using an power offset Δservice which depends on a service type of the HS-DSCH.

$\Delta i = \Delta i - \Delta adj \times BLER_{target} + \Delta service$ (in the case that a determination result is "Ack")

$\Delta i = \Delta i - \Delta adj \times BLER_{target} + \Delta service$ (in the case that a determination result is "Nack")

$\Delta i = \Delta i + \Delta adj \times (1 - BLER_{target}) + \Delta service$ (in the case that a determination result is "DTX")

Alternatively, the HS-SCCH instantaneous transmission power control unit 14 controls the power offset Δi based on the following equations.

$\Delta i = \Delta i - \Delta adj \times BLER_{target} + \Delta service$ (in the case that a determination result shows that there is no block error in the HS-SCCH)

$\Delta i = \Delta i + \Delta adj \times (1 - BLER_{target}) + \Delta service$ (in the case that a determination result shows that there is a block error in the HS-SCCH)

Additionally, in accordance with a service type, the HS-SCCH instantaneous transmission power control unit 14 may control the power offset Δservice which depends on the service type.

For example, the HS-SCCH instantaneous power control unit 14 can set a larger power offset Δservice, in order to decrease delays caused by an error of the HS-SCCH, in the case of rendering services in which delays caused by errors is not desirable such as an IP telephone service or a streaming service, by using the HSDPA system.

On the other hand, the HS-SCCH instantaneous transmission power control unit 14 may set a smaller power offset Δservice, in the case of rendering services whose quality is not affected so greatly by delays caused by errors such as transmission/reception of FTP or electronic mail, by using the HSDPA system.

As a result, it is possible to provide a communication system in accordance with QoS (Quality of Service).

Incidentally, when the number of HS-SCCH is plural, the HS-SCCH instantaneous transmission power control unit 14 carries out the process described above for each of HS-SCCHs.

The target value $BLER_{target}$ can be changed based on the service type.

The control methods of the power offset are not limited to the aforementioned algorithms. Other outer loop algorithms may be applied as long as they satisfy desirable communication quality of the HS-SCCH.

The statistics calculation unit 15 is configured to calculate statistical values of transmission power per each of HS-SCCHs transmitted during a predetermined period, e.g., an average value and a variance value, by use of predetermined algorithm.

The statistics calculation unit 15 transmits the calculation results to the HS-SCCH temporary maximum transmission power control unit 16.

The HS-SCCH temporary maximum transmission power control unit 16 is configured to set maximum transmission power per each of HS-SCCHs (hereinafter referred to as HS-SCCH temporary maximum transmission power) during a predetermined period by use of a predetermined temporary maximum transmission power control algorithm, based on the statistical values of the transmission power of the HS-SCCHs transmitted from the statistics calculation unit 15.

The HS-SCCH temporary maximum transmission power control unit 16 transmits the set HS-SCCH temporary maximum transmission power to the limitation unit 17.

Now, description will be made of an example of the temporary maximum transmission power control algorithm.

The HS-SCCH temporary maximum transmission power control unit 16 calculates or updates temporary maximum transmission power $P_{HS\text{-}SCCH,\ temporary\ max}$ per each of HS-SCCHs, based on the following equation.

$P_{HS\text{-}SCCH,\ temporary\ max} = \alpha \times MEAN_{HS\text{-}SCCH} + \beta \times \sqrt{Variance_{HS\text{-}SCCH}}$ Here, α and β are parameter coefficients. $MEAN_{HS-SCCH}$ is an average value of transmission power per each of HS-SCCHs transmitted from the statistics calculation unit 15. $Variance_{HS-SCCH}$ is a variance value of transmission power per each of HS-SCCHs transmitted from the statistics calculation unit 15. Calculations of $MEAN_{HS-SCCH}$ and $Variance_{HS-SCCH}$ are as follows.

$$MEAN_{HS-SCCH} = (1-\tau) \times P_{HS-SCCH} + \tau \times MEAN_{HS-SCCH}$$

$$Variance_{HS-SCCH} = (1-\tau) \times (P_{HS-SCCH} - MEAN_{HS-SCCH})^2 + \tau \times Variance_{HS-SCCH}$$

Here, τ is a parameter for determining a predetermined period in which an average value is obtained.

It is assumed that a statistical processing of the average value $MEAN_{HS-SCCH}$ and the variance value $Variance_{HS-SCCH}$ is carried out for all the HS-SCCHs transmitted to the mobile stations.

On the other hand, no statistical processing of the average value $MEAN_{HS-SCCH}$ and the variance value $Variance_{HS-SCCH}$ is carried out for the HS-SCCH not transmitted because of an absence of a mobile station to which a channel is assigned.

The calculations of the average value $MEAN_{HS-SCCH}$ and the variance value $Variance_{HS-SCCH}$ are not limited to the methods described above. Normal calculation can be carried out after determining a measurement period.

Furthermore, in this embodiment, the average value and the variance value are cited as statistical values. However, the statistical values of the present invention are not limited to such an average value and a variance value. Other indexes may be chosen as long as the transmission power of the HS-SCCH can be estimated.

The HS-SCCH temporary maximum transmission power control unit 16 may be configured to limit the HS-SCCH temporary maximum transmission power $P_{HS-SCCH, temporary\ max}$ by the maximum transmission power (upper limit value) $P_{HS-SCCH, max}$ per each of HS-SCCHs, based on the following equation.

$$P_{HS-SCCH, temporary\ max} = P_{HS-SCCH, max} \text{ (when } P_{HS-SCCH, temporary\ max} > P_{HS-SCCH, max})$$

That is, the HS-SCCH temporary maximum transmission power control unit 16 may be configured to control the HS-SCCH temporary maximum transmission power $P_{HS-SCCH, temporary\ max}$ so as not to exceed the upper limit value $P_{HS-SCCH, max}$ set for each HS-SCCH.

The limitation unit 17 is configured to limit the transmission power of the HS-SCCH (HS-SCCH instantaneous transmission power) for each TTI transmitted from the HS-SCCH instantaneous transmission power control unit 14, by the HS-SCCH temporary maximum transmission power sent from the HS-SCCH temporary maximum transmission power control unit 16 as the upper limit value.

That is, the limitation unit 17 controls the transmission power of the HS-SCCH (HS-SCCH instantaneous transmission power) so as not to exceed the HS-SCCH temporary maximum transmission power.

Specifically, the limitation unit 17 sets the HS-SCCH temporary maximum transmission power as the transmission power of the HS-SCCH, when the transmission power of the HS-SCCH (HS-SCCH instantaneous transmission power) is larger than the HS-SCCH temporary maximum transmission power.

On the other hand, the limitation unit 17 sets the HS-SCCH instantaneous transmission power as the transmission power of the HS-SCCH, when the transmission power of the HS-SCCH (HS-SCCH instantaneous transmission power) is smaller than the HS-SCCH temporary maximum transmission power.

That is, the limitation unit 17 can control the transmission power of the HS-SCCH so as not to exceed the HS-SCCH temporary maximum transmission power.

Figure 6:
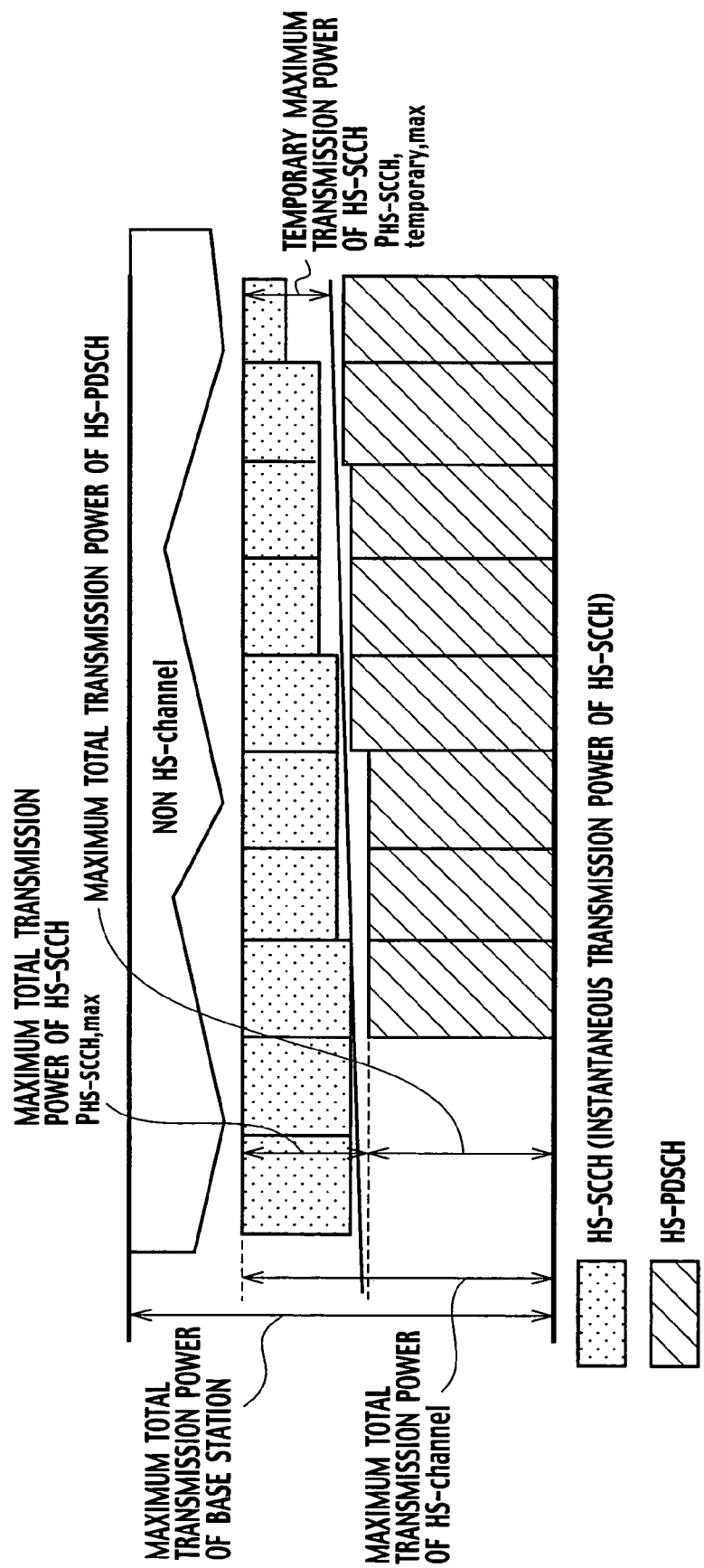
FIG. 6 is a view showing an example of a method for controlling transmission power of a shared control channel in the radio communications control system according to the embodiment of the present invention.

FIG. 6 is an image view showing how the aforementioned temporary maximum transmission power control is carried out.

That is, the HS-SCCH temporary maximum transmission power is set small, when the transmission power of the HS-SCCH is determined to be small, based on the past statistical value of the transmission power of the HS-SCCHs.

On the other hand, the HS-SCCH temporary maximum transmission power is set large, when the transmission power of the HS-SCCH is determined to be large, based on the past statistical value of the transmission power of the HS-SCCHs.

Accordingly, the transmission power can be efficiently secured for the HS-PDSCH, so as to increase throughput of the system and each user.

For example, when the number of mobile stations UE in a cell is large, the HS-DSCHs are assigned only to the mobile stations UE of good communication quality, because of diversity effects of the mobile stations UE by scheduling. Thus, a probability of smaller transmission power of the HS-SCCH which satisfies a desired block error rate naturally becomes high.

That is, in the described case, since an average value of the transmission power of the HS-SCCHs becomes small, and the HS-SCCH are always assigned to the mobile stations UE of good communication quality, a variance value of the transmission power of the HS-SCCHs also becomes small. As a result, the HS-SCCH temporary maximum transmission power becomes small, and the transmission power allocated to the HS-DSCH is increased by a corresponding amount.

On the other hand, when the number of mobile stations UE in a cell is small, since the HS-DSCHs are assigned to various mobile stations UE, from mobile stations of good communication quality to mobile stations of bad communication quality, compared with the case of many mobile stations UE, an average value of the transmission power of the HS-SCCHs becomes large, and a variance value of the transmission power of the HS-SCCHs becomes large. As a result, the HS-SCCH temporary maximum transmission power becomes large.

Thus, when the HS-SCCH temporary maximum transmission power is large, a block error rate of the HS-SCCH of the mobile station of bad communication quality is improved. This is effective in that the service quality of the mobile station of bad communication quality is improved.

Moreover, in the descried case, when not much HS-SCCH transmission power is secured while the transmission power of the HS-DSCH is maintained as it is, total transmission power of the cell can be decreased. Thus, it is possible to decrease interference power to other cells.

Incidentally, the radio communications control system of the embodiment may be configured to carry out only the instantaneous transmission power control described above, or to carry out only the temporary maximum transmission power control described above.

In the former case, the limitation unit 17 limits the transmission power of the HS-SCCH, by the maximum transmission power of predetermined HS-SCCH, which is set as an upper limit value.

<Operation of the Radio Communications Control System of the Embodiment>

Description will be made of an operation of the radio communications control system 10 of the embodiment with reference to FIG. 7.

FIG. 7 is a flowchart showing an example of an operation of controlling the HS-SCCH instantaneous transmission power, by using the HSDPA system, in the IMT-2000 system which uses the W-CDMA mode.

In step 1001, the HS-SCCH instantaneous transmission power control unit 14 determines a power offset based on a determination result transmitted from the determination unit 13.

Here, the determination result may regard presence of a block error of the HS-SCCH or feedback information used for the HARQ of the HS-DSCH in the HS-PDSCH.

In step 1002, the HS-SCCH instantaneous transmission power control unit 14 determines HS-SCCH instantaneous transmission power, based on a predetermined HS-SCCH instantaneous transmission power control algorithm using the power offset and the transmission power of the A-DPCH of the mobile station to which the HS-SCCH is assigned at the TTI.

Meanwhile, in step 1003, the statistics calculation unit 15 calculates statistical value of transmission power per each of HS-SCCHs which have been transmitted, e.g., an average value, a variance value etc., by using a predetermined temporary maximum transmission power control algorithm.

In step 1004, the HS-SCCH temporary maximum transmission power control unit 16 determines temporary maximum transmission power per each of HS-SCCHs in accordance with the statistical value of the transmission power of the HS-SCCHs transmitted from the statistics calculation unit 15, by using a predetermined temporary maximum transmission power control algorithm.

In step 1005, the limitation unit 17 limits the HS-SCCH instantaneous transmission power transmitted from the HS-SCCH instantaneous transmission power control unit 14, by the HS-SCCH temporary maximum transmission power transmitted from the HS-SCCH temporary maximum transmission power control unit 16, which is set as an upper limit.

Incidentally, an application range of the radio communications control system and the radio communications control method according to the present invention is not limited to the HSDPA system which is a high-speed packet transmission system in the IMT-2000 system of the W-CDMA mode, but useful in a high-speed packet transmission system in the IMT-2000 system of a CDMA-TDD mode or a CDMA 2000 mode.

<Operation and Effect of the Radio Communications Control System According to the Embodiment>

According to the radio communications control system of the embodiment, transmission power (HS-SCCH instantaneous transmission power) of a shared control channel (HS-SCCH) can be appropriately set based on communication quality of the shared control channel (HS-SCCH), i.e., a propagation environment, and it is not necessary to secure an extra amount of transmission power for the shared control channel (HS-SCCH). Thus, it is possible to secure more transmission power by a corresponding amount for the shared packet channel (HS-PDSCH), and to improve throughput of the system and each user.

According to the radio communications control system of the embodiment, when transmission power (HS-SCCH instantaneous transmission power) of the shared control channel (HS-SCCH) is appropriately set while transmission power of the shared packet channel (HS-PDSCH) is maintained as it is, total transmission power in the cell which is managed by the radio communications control system can be reduced. Thus, it is possible to reduce interference power with the other cells.

According to the radio communications control system of the embodiment, it is possible to control more appropriate and efficient transmission power of the shared control channel (HS-SCCH) by controlling a power offset in an outer loop fashion based on a block error rate of the shared control channel (HS-SCCH).

According to the radio communications control system of the embodiment, it is possible to control more appropriate and efficient transmission power of the shared control channel (HS-SCCH) by controlling a power offset in the outer loop fashion based on feedback information of retransmission control.

According to the radio communications control system of the embodiment, it is possible to provide communication services in accordance with quality of service (QoS) by setting a large power offset in the case of rendering services of low durability against a transmission delay such as IP telephone services or streaming services, and a small power offset in the case of rendering services of high durability against a transmission delay such as FTP services or electronic mail services.

According to the radio communications control system of the embodiment, since maximum transmission power of the shared control channel (HS-SCCH) can be appropriately set in accordance with a situation of each time, it is not necessary to secure extra transmission power for the shared control channel (HS-DSCH). Thus, it is possible to secure much transmission power by a corresponding amount for the shared packet channel (HS-PDSCH), and to improve throughput of the system and each user.

Furthermore, according to the radio communications control system of the embodiment, it is possible to appropriately and efficiently control transmission power of the shared control channel (HS-SCCH) by controlling maximum transmission power of the shared control channel (HS-SCCH) based on statistics of transmission power of the shared control channel (HS-SCCH).

As described above, according to the present invention, it is possible to provide the radio communications control system and the radio communications control method, which efficiently control the transmission power of the shared control channel, even if the shared control channel (HS-SCCH) for transmitting control signals to the plurality of mobile stations UE and the shared packet channel (HS-PDSCH) for transmitting packet data to the plurality of mobile stations UE deviate from each other in transmission timing.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio communications control system for controlling transmission power of a shared control channel for transmitting control signals to a plurality of mobile stations; the system comprising:

a determination unit configured to determine a communication quality of the shared control channel; and a transmission power controller configured to control the transmission power of the shared control channel based on a transmission power of a dedicated channel accompanying the shared control channel and the communication quality of the shared control channel received from the determination unit by adding a power offset to a value of the transmission power of the dedicated channel, said power offset being determined based on a block error rate of the shared control channel and a service type of a shared packet channel for transmitting packet data to the plurality of mobile stations.

2. The radio communications control system as set forth in claim 1, wherein
the transmission power controller is configured to control the power offset in accordance with the communication quality of the shared control channel.

3. A radio communications control system for controlling transmission power of a shared control channel for transmitting control signals to a plurality of mobile stations; the system comprising:
a determination unit configured to determine a communication quality of the shared control channel; and
a transmission power controller configured to control the transmission power of the shared control channel based on a transmission power of a dedicated channel accompanying the shared control channel and the communication quality of the shared control channel received from the determination unit,
wherein the transmission power controller is configured to set the transmission power of the shared control channel by changing the transmission power of the dedicated channel based on a power offset, to control the power offset in accordance with the communication quality of the shared control channel, is configured to use a block error rate of the shared control channel as the communication quality of the shared control channel, and is configured to control the power offset so that the block error rate of the shared control channel can reach a target value.

4. A radio communications control system for controlling transmission power of a shared control channel for transmitting control signals to a plurality of mobile stations; the system comprising:
a determination unit configured to determine a communication quality of the shared control channel; and
a transmission power controller configured to control the transmission power of the shared control channel based on a transmission power of a dedicated channel accompanying the shared control channel and the communication quality of the shared control channel received from the determination unit,
wherein the transmission power controller is configured to set the transmission power of the shared control channel by changing the transmission power of the dedicated channel based on a power offset and is configured to control the power offset in accordance with the communication quality of the shared control channel, and
the transmission power controller is configured to use feedback information used for retransmission control in a shared packet channel for transmitting packet data to the plurality of mobile stations as the communication quality of the shared control channel, is configured to decrease the power offset when receiving the feedback information, and is configured to increase the power offset when not receiving the feedback information.

5. A radio communications control system for controlling transmission power of a shared control channel for transmitting control signals to a plurality of mobile stations; the system comprising:
a determination unit configured to determine a communication quality of the shared control channel; and
a transmission power controller configured to control the transmission power of the shared control channel based on a transmission power of a dedicated channel accompanying the shared control channel and the communication quality of the shared control channel received from the determination unit,
wherein the transmission power controller is configured to set the transmission power of the shared control channel by changing the transmission power of the dedicated channel based on a power offset and is configured to control the power offset in accordance with the communication quality of the shared control channel, and
the transmission power controller is configured to control the power offset in accordance with a service type of a shared packet channel for transmitting packet data to the plurality of mobile stations.

6. The radio communications control system as set forth in claim 1, further comprising a maximum transmission power controller configured to control a maximum transmission power of the shared control channel during a predetermined period;
and wherein the transmission power controller is configured to control the transmission power of the shared control channel so as not to exceed the maximum transmission power.

7. A radio communications control system for controlling transmission power of a shared control channel for transmitting control signals to a plurality of mobile stations; the system comprising:
a determination unit configured to determine a communication quality of the shared control channel; and
a transmission power controller configured to control the transmission power of the shared control channel based on a transmission power of a dedicated channel accompanying the shared control channel and the communication quality of the shared control channel received from the determination unit;
a maximum transmission power controller configured to control a maximum transmission power of the shared control channel during a predetermined period;
wherein the transmission power controller is configured to control the transmission power of the shared control channel so as not to exceed the maximum transmission power, and
the maximum transmission power controller is configured to control the maximum transmission power in accordance with a statistical value of the transmission power of the shared control channels.

8. The radio communications control system as set forth in claim 6, wherein the maximum transmission power controller is configured to control the maximum transmission power so as not to exceed an upper limit value per each of the shared control channels.

9. A radio communications control method implemented on a radio communications control device for controlling transmission power of a shared control channel for transmitting control signals to a plurality of mobile stations; the method comprising:
determining, at a determination unit of the radio communications control device, a communication quality of the shared control channel; and controlling, at a transmission power controller of the radio communications control device, the transmission power of the shared control channel based on a transmission power of a dedicated channel accompanying the shared control channel and the determined communication quality of the shared control channel by adding a power offset to a value of the transmission power of the dedicated channel, said power offset being determined based on a block error rate of the shared control channel and a service type of a shared packet channel for transmitting packet data to the plurality of mobile stations.

* * * * *